United States Patent [19]

Mesnel

[11] Patent Number: 5,398,451
[45] Date of Patent: Mar. 21, 1995

[54] VEHICLE GLASS RUN CHANNEL WITH CORNER INSERT

[75] Inventor: Gerard Mesnel, Carrieres, S/Seine, France

[73] Assignee: The Standard Products Company, Cleveland, Ohio

[21] Appl. No.: 184,473

[22] Filed: Jan. 21, 1994

[51] Int. Cl.⁶ .............................................. E06B 7/16
[52] U.S. Cl. .................................. 49/479.1; 49/440
[58] Field of Search ............... 49/479.1, 490.1, 440, 49/441

[56] References Cited

U.S. PATENT DOCUMENTS

| | | |
|---|---|---|
| 2,101,349 | 12/1937 | Sharp . |
| 2,278,756 | 4/1942 | Wright .................. 49/479.1 X |
| 3,219,100 | 11/1965 | Johnston et al. . |
| 3,709,533 | 1/1973 | Walters . |
| 3,756,636 | 9/1973 | Jackson . |
| 4,010,573 | 3/1977 | Andrzejewski . |
| 4,055,910 | 11/1977 | Schmidt . |
| 4,444,525 | 4/1984 | Alander . |
| 4,614,061 | 9/1986 | Brocke . |
| 4,783,931 | 11/1988 | Kirkwood . |
| 4,910,918 | 3/1990 | Naples et al. . |
| 5,095,656 | 3/1992 | Keys ........................................ 49/441 |

FOREIGN PATENT DOCUMENTS 2628767  12/1977  Germany .

Primary Examiner—Philip C. Kannan
Attorney, Agent, or Firm—Harness, Dickey & Pierce

[57] ABSTRACT

A vehicle glass run channel comprises a pair of elongated members which are joined in a mitered corner at the intersection of the vehicle door header and vertical pillar. The elongated members are secured together and reinforced by a corner insert. The corner insert has a generally U-shaped body providing an inner and outer leg joined by a web. Generally horizontally extending inner and outer wings extend respectively from the inner and outer leg and generally vertically disposed inner and outer wings extend respectively from the inner and outer legs. The wings slidably fit within corresponding internal (channels) formed in legs of the glass run header channel and glass run vertical channel.

7 Claims, 2 Drawing Sheets

VEHICLE GLASS RUN CHANNEL WITH CORNER INSERT

BACKGROUND OF THE INVENTION

The present invention relates to glass run channel for automotive vehicles and, more particularly, to a vehicle glass run channel having a corner insert.

Vehicle glass run channel is used in automotive vehicles and the like to movably support window panes which have translational movement between an open and closed position. The glass run channel guides and supports the window pane and forms a seal around the perimeter of the window pane to protect the passenger compartment from the weather elements.

Glass run channel must be structurally sound and while also allowing translational movement of the window pane without undue resistance. Automotive window openings are often designed to have a shape which poses a challenge to the design and manufacture of a glass run channel which extends around the necessary periphery of the window opening and yet meet the above requirements. In particular, the corner structure of glass run channel is problematic with respect to structural integrity and visual appearance.

In accordance with the present invention, a glass run channel is provided for an automotive vehicle which has an improved corner insert. The glass run channel is structurally sound and has a pleasing visual appearance particularly in the traditionally difficult corner area. Furthermore, the corner insert facilitates improved accuracy in manufacture of the length of glass run channel.

Further understanding of the invention will be had from the accompanying drawings and following specification.

SUMMARY OF THE INVENTION

In accordance with the present invention, a vehicle glass run channel comprises a pair of elongated members which are joined in a mitered corner at the intersection of the vehicle door header and vertical pillar. The elongated members are secured together and reinforced by a corner insert. The corner insert has a generally U-shaped body providing an inner and outer leg joined by a web. Generally horizontally extending inner and outer wings extend respectively from the inner and outer leg and generally vertically disposed inner and outer wings extend respectively from the inner and outer legs. The wings closely fit within corresponding pockets formed in legs of the glass run header channel and glass run vertical channel.

DESCRIPTION OF THE PREFERRED EMBODIMENT

Figure 1:
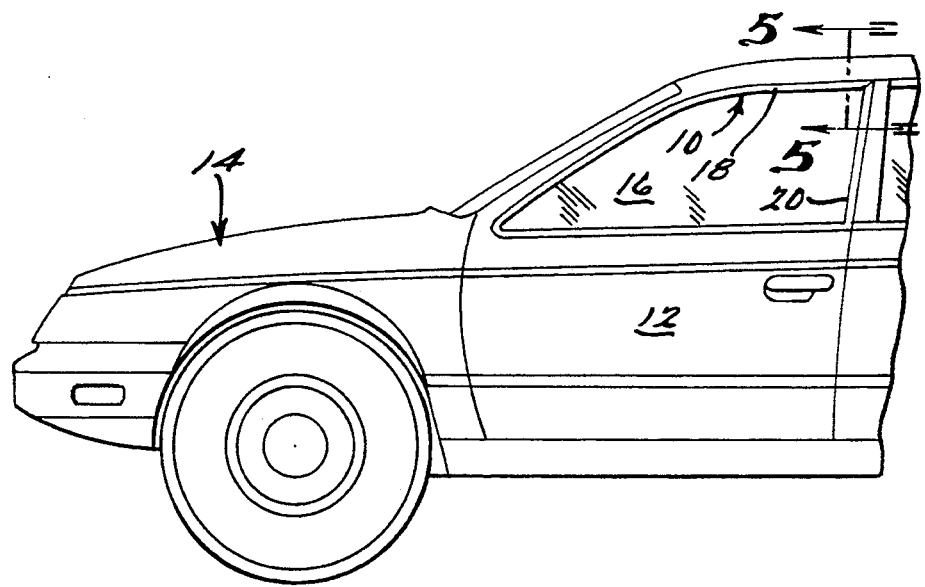
FIG. 1 is a partial elevational view of a vehicle showing a preferred embodiment of a vehicle glass run channel with corner insert of the present invention.
Figure 2:
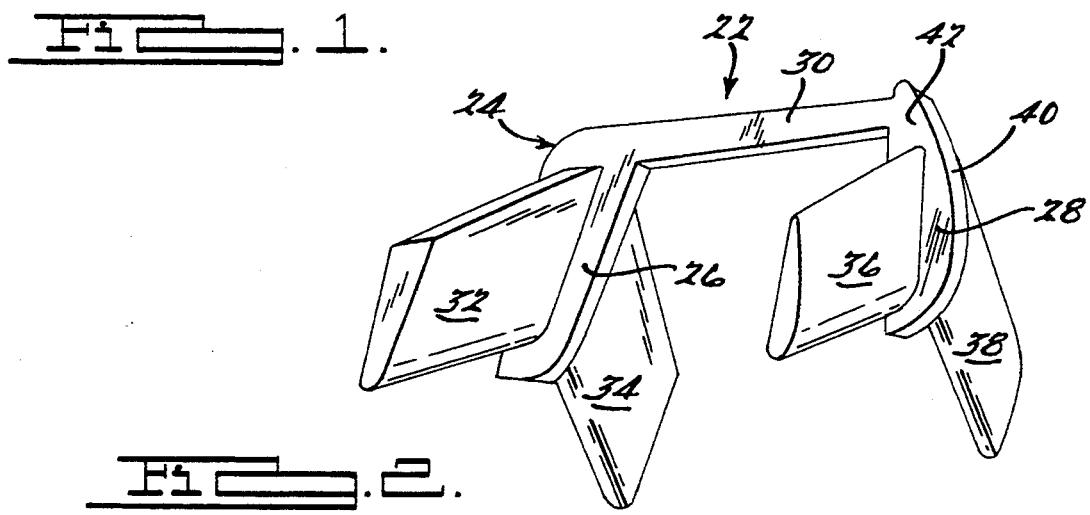
FIG. 2 is an enlarged perspective view of a preferred embodiment of a corner insert of the present invention.
Figure 3:
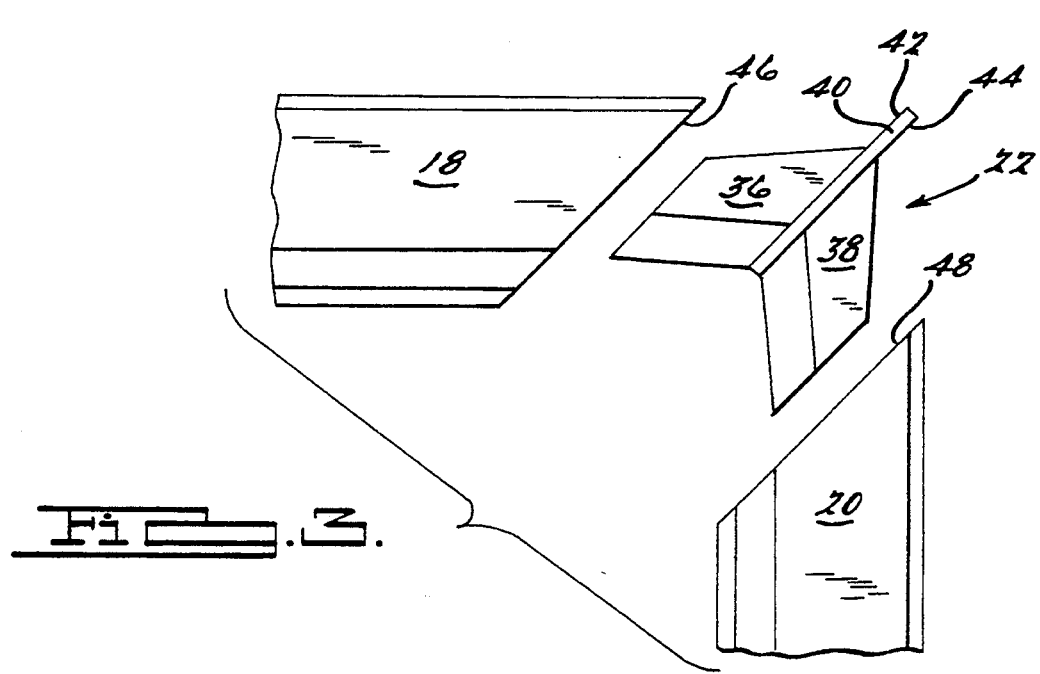
FIG. 3 is a partial exploded elevational view showing the corner insert of FIG. 2 in relationship to associated horizontal header glass run and pillar glass run members.
Figure 4:
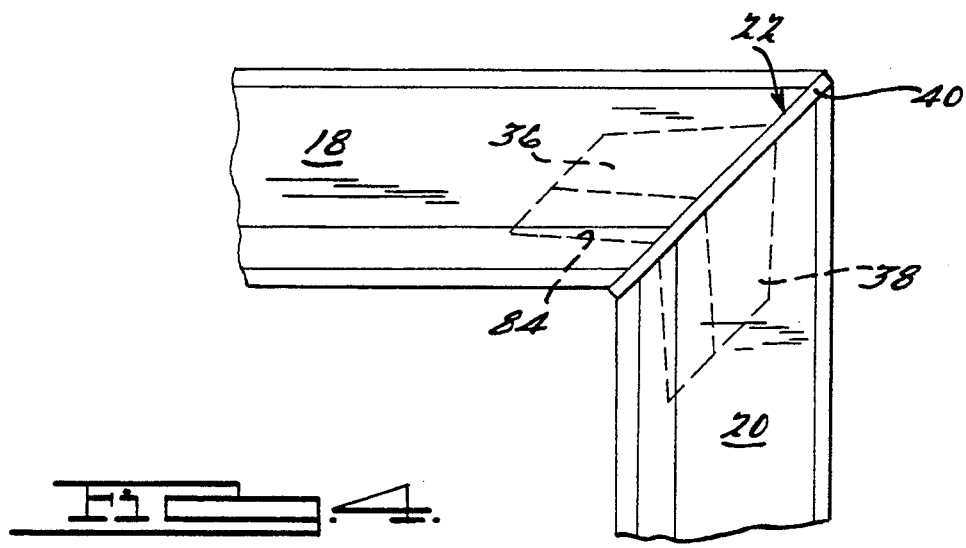
FIG. 4 is a partial elevational view showing the vehicle glass run channel with corner insert of FIG. 1.

Now referring to the figures, a preferred embodiment of the glass run channel with corner insert of the present invention is illustrated in FIG. 1 and indicated by the numeral 10. Glass run channel 10 is shown installed on door 12 of automobile 14 and is in operative association with window pane 16 which is vertically translational between open and closed positions as is conventional in modern automotive vehicles.

Broadly speaking, glass run channel 10 comprises a header 18 and a pillar 20 which are joined in a mitered corner at the intersection of the vehicle door header and vertical pillar with insert 22.

Insert 22 has a generally U-shaped body 24 with inner leg 26 and outer leg 28 joined by web 30. The terms "inner" and "outer" as used herein are with reference to the interior and exterior of automotive vehicle 14. Extending outwardly from inner leg 26 and generally at a right angle with respect to each other are inner header wing 32 and inner pillar wing 34. Extending outwardly from outer leg 28 generally at a right angle with respect to each other are outer header wing 36 and outer pillar wing 38. Outer leg 28 has a show surface 40 which is presented to view exterior of the automotive vehicle. Body 24 of insert 22 has a thin width, on the order of 2 mm, so that show surface 40 is presented as a thin clean line to an observer. U-shaped body 24 has side surfaces 42 and 44 which abut against mitered ends 46 and 48 of respective header 18 and pillar 20. This allows accurate sizing of the lengths of header 18 and pillar 20.

Figure 5:
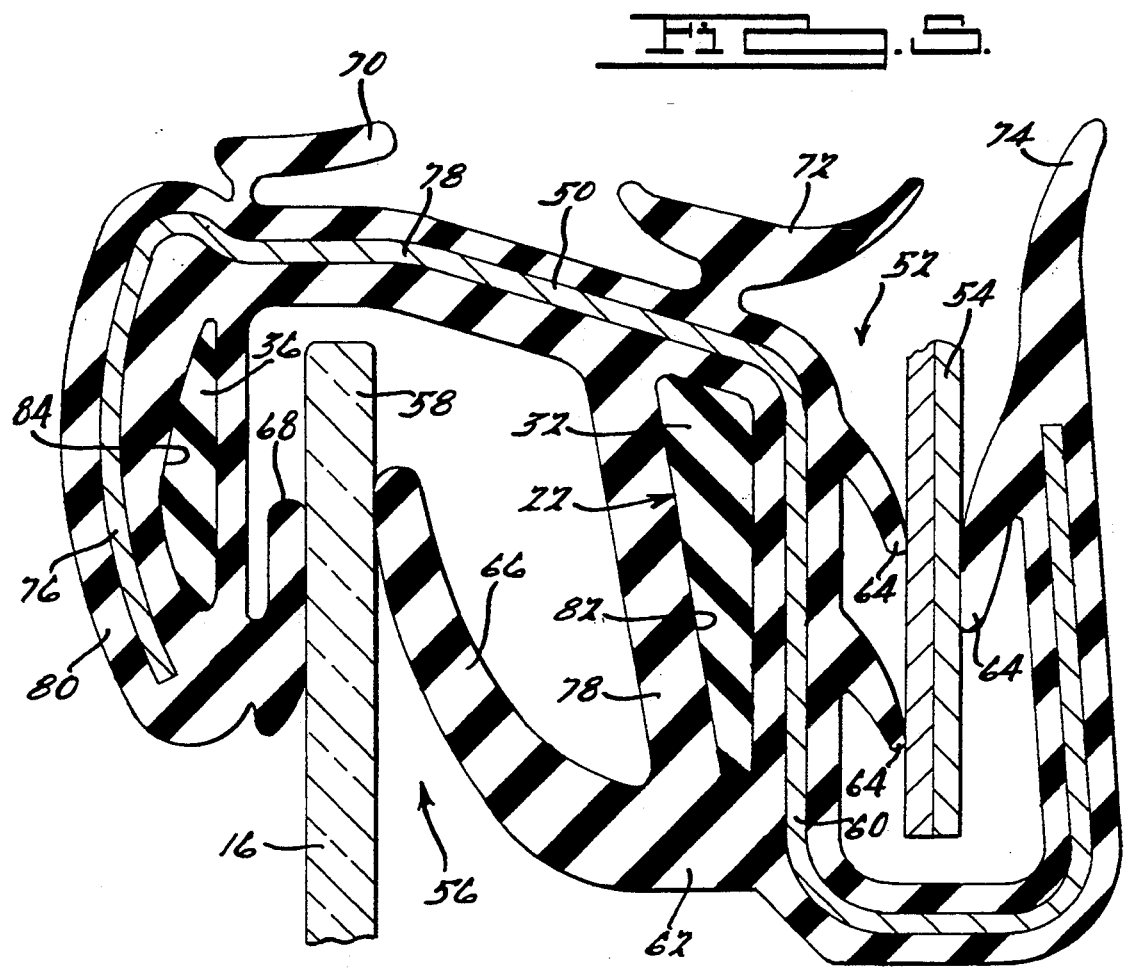
FIG. 5 is a sectional view taken along line 5—5 in FIG. 1.

As is best shown in FIG. 5, header 18 includes a metallic reinforcing core 50. Core 50 may be a solid metal core as illustrated in the figure or optionally may be formed from flexible wire, lanced or perforated metal core or even suitable polymeric material. Core 50 is formed into a generally S-shape thereby providing a U-shaped channel portion 52 to attach to flange 54. Core 50 also has a U-shaped glass run channel portion 56 which receives edge 58 of glass pane 16. U-shaped channel portion 52 and U-shaped glass run channel portion 56 share a common leg 60. An elastomeric skin 62 covers core 50 and has polymeric retention ribs 64 within U-shaped channel portion 52 and glass guiding and sealing members 66 and 68 within U-shaped glass run channel portion 56 and also has sealing ribs 70, 72 and 74 extending from elastomeric skin 62 to provide a weather seal with respect to door 12.

U-shaped glass run channel portion 56 of core 50 has common leg 60 and outer leg 76 joined by web 78. Elastomeric skin 62 has a portion 78 associated with leg 60 and a portion 80 associated with leg 76. Elastomeric skin leg 78 has a pocket 82 therein while elastomeric leg 80 has a pocket 84 therein. Pocket 82 is selectively sized to tightly receive inner header wing 32 while pocket 84 is selectively sized to tightly receive outer header wing 36 of insert 22.

Generally vertically extending pillar 20 is of cross-sectional shape analogous to header 18 as shown in FIG. 5 with corresponding pockets in the elastomeric skin to receive inner pillar wing 34 and outer pillar wing 38 of insert 22.

In the manufacture of glass-run channel 10, header 18 and pillar 20 are extruded and miter cut to length as is conventional in the art. Then, insert 22 is joined to the mitered ends of header 18 and pillar 20. In a rubber mold, wings 32, 34 are inserted into associated pockets in header 18 and pillar 20 and wings 36 and 38 are inserted into associated pockets in header 18 and pillar 20. Surfaces 46 and 48 of header 18 and pillar 20 are brought into abutting relationship with facing surfaces 42 and 44 of insert 22. The accuracy of the length of header 18 and pillar 20 is not affected by the molding process. This allows accurate sizing of the length of each of header 18 and pillar 20. Then rubber is injected into the cavity around insert 22 proximate to web 30 to bond the corner structure.

While the above description describes a preferred embodiment of the present invention, it will be understood that the present invention is susceptible to modification, variation and alteration without varying from the scope and fair meaning of the following claims. For example, the cross-section of header 18 and pillar 20 can be varied somewhat within the broad scope of the present invention.

What is claimed is:

1. A glass run channel for a vehicle, the glass run channel having:
   (A) an elongated header glass run member;
   (B) an elongated pillar glass run member; and
   (C) a corner insert;
   each said header member and pillar member having a generally U-shaped channel for receiving an edge of an associated glass pane, each said channel having a leg comprised of elastomeric material and having a pocket therein, said header member and said pillar member having mitered ends joined at a corner by said corner insert positioned therebetween and secured thereto, said insert having a generally U-shape with legs joined by a web, each leg having a wing extending outwardly therefrom into an associated pocket and being fixedly secured therein.

2. A glass run channel as in claim 1 wherein said insert has an outer leg having a surface exposed to view and a pair of opposing surfaces, each in contacting relationship with an associated end surface of one of said header member and said pillar member.

3. A glass run channel as in claim 2 wherein each of said wings is tapered.

4. A glass run channel as in claim 3 wherein each said wing is secured within an associated pocket by elastomeric material.

5. A glass run channel as in claim 3 wherein each said wing is secured within an associate pocket by press fit.

6. A glass run channel as in claim 4 wherein each said member has a metal core with an elastomeric skin.

7. A glass run channel as in claim 1 wherein said wings are in pairs, each wing extending generally perpendicular to another wing.

* * * * *